US011845404B2

(12) United States Patent
Gaucher et al.

(10) Patent No.: US 11,845,404 B2
(45) Date of Patent: Dec. 19, 2023

(54) ADAPTER FOR CONNECTING A WINDSHIELD WIPER TO A DRIVE ARM OF A WIPER SYSTEM FOR A MOTOR VEHICLE

(71) Applicant: Valeo Systèmes d'Essuyage, Le Mesnil Saint Denis (FR)

(72) Inventors: Vincent Gaucher, Issoire (FR); Olivier Jomard, Issoire (FR); Stéphane Houssat, Issoire (FR); Guillaume Mouleyre, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 17/299,493

(22) PCT Filed: Nov. 26, 2019

(86) PCT No.: PCT/EP2019/082501
§ 371 (c)(1),
(2) Date: Jun. 3, 2021

(87) PCT Pub. No.: WO2020/114828
PCT Pub. Date: Jun. 11, 2020

(65) Prior Publication Data
US 2022/0080928 A1 Mar. 17, 2022

(30) Foreign Application Priority Data
Dec. 4, 2018 (FR) ...................... 1872290

(51) Int. Cl.
*B60S 1/40* (2006.01)
*B60S 1/34* (2006.01)
(52) U.S. Cl.
CPC ........... *B60S 1/4048* (2013.01); *B60S 1/3429* (2013.01); *B60S 1/4038* (2013.01); *B60S 1/4045* (2013.01);
(Continued)

(58) Field of Classification Search
CPC .... B60S 1/4038; B60S 1/4045; B60S 1/4048; B60S 1/4064; B60S 2001/4051; B60S 2001/4054; B60S 1/3429
(Continued)

(56) References Cited

U.S. PATENT DOCUMENTS

2006/0059647 A1* 3/2006 Ostrowski ............. B60S 1/4038
15/250.43
2006/0064842 A1* 3/2006 Verelst .................. B60S 1/3868
15/256.5
(Continued)

FOREIGN PATENT DOCUMENTS

DE 10326266 A1 1/2004
DE 10320930 A1 11/2004
(Continued)

OTHER PUBLICATIONS

Machine translation of description portion of German publication 10326266 published Jan. 2004. (Year: 2004).*
(Continued)

*Primary Examiner* — Gary K. Graham
(74) *Attorney, Agent, or Firm* — Osha Bergman Watanabe & Burton LLP (57) ABSTRACT

The invention relates to an adapter intended to connect a wiper blade (7) to a drive arm (5) of a wiper system (800) for a vehicle, the adapter (IO0) comprising a head (I) and a body (2), the adapter (IO0) being formed by an upper wall (IO, 20) and two lateral flanks (I la, I lb, 2*la*, 2*lb*), the adapter (IO0) comprising a centring means (3) for centring in a vertical direction (Oz) perpendicular to the upper wall (IO, 20), characterised in that the centring means (3) is extended longitudinally by a guide member (9) configured to be engaged with the drive arm (5), the adapter (IO0) comprising a tab (4) configured to wedge the adapter (IO0) in the
(Continued)

vertical direction (Oz). The invention is applicable to motor vehicles.

14 Claims, 4 Drawing Sheets

(52) U.S. Cl.
    CPC ..... *B60S 1/4064* (2013.01); *B60S 2001/4051* (2013.01); *B60S 2001/4054* (2013.01)

(58) Field of Classification Search
    USPC .................................. 15/250.32, 250.351
    See application file for complete search history.

(56) References Cited

U.S. PATENT DOCUMENTS

| 2015/0151718 A1* | 6/2015 | Moll | ................. B60S 1/4048 |
| | | | 15/250.32 |
| 2016/0001745 A1* | 1/2016 | Yoshimoto | ............. B60S 1/381 |
| | | | 29/428 |

FOREIGN PATENT DOCUMENTS

| DE | 20321703 U1 | 1/2009 |
| EP | 3403889 A1 | 11/2018 |
| FR | 3056514 A1 | 3/2018 |
| JP | S59-013715 U | 1/1984 |
| WO | 2017136845 A1 | 8/2017 |
| WO | 2018050325 A1 | 3/2018 |

OTHER PUBLICATIONS

International Search Report and Written Opinion in corresponding International Application No. PCT/EP2019/082501, dated Feb. 11, 2020 (11 pages).

Notice of Reasons for Refusal in corresponding Japanese Application No. 2021-531768, dated Jul. 26, 2022 (4 pages).

* cited by examiner

ADAPTER FOR CONNECTING A WINDSHIELD WIPER TO A DRIVE ARM OF A WIPER SYSTEM FOR A MOTOR VEHICLE

The invention relates to the field of wiping and/or cleaning the glazed surfaces of a motor vehicle, and relates more particularly to a connection device between a windshield wiper and a drive arm thereof.

Wipers for motor vehicles are designed to remove liquids and dirt, which can disrupt the driver's view of his surroundings, by wiping. These wipers generally comprise at least one drive arm, which effects an angular back-and-forth movement over a glazed surface of the vehicle, and at least one windshield wiper equipped with a blade rubber made of an elastic material. By rubbing against this glazed surface, this blade rubber wipes the water and some of the dirt therefrom, and evacuates them from the driver's field of view.

Regardless of the configuration of the windshield wiper (articulated brackets which retain the blade rubber in several distinct areas, or a metal blade which holds the blade rubber along its entire length, for example), the latter is attached to the drive arm of the wiping system by a connection assembly which generally comprises at least one connector and an adapter. The connector is secured to the windshield wiper, and the adapter is a part that is configured, for the one part, to cooperate with the connector and, for the other part, to be fitted together with an end part, or yoke, of the drive arm. Therefore, the connector and adapter cooperate in order to fasten the windshield wiper to the drive arm.

In the market for the sale of parts and accessories for retrofitting motor vehicles, it is known to provide one and the same windshield wiper, sold equipped with its own connector, that is adaptable to several types of drive arm. It is therefore appropriate to design an adapter that is usable with the largest possible number of types of arm yokes and with the largest possible number of types of windshield wiper connectors, since it is the adapter that forms the interface between these two elements.

An aim of the present invention is to provide a solution that makes it possible to connect a windshield wiper to a particular type of drive arm yoke for a wiper system of a motor vehicle, said yoke having, perpendicularly to its longitudinal direction of extension, a section in the shape of an inverted U, the vertical legs of which are formed by two lateral walls of this yoke and the transverse leg of which is formed by an upper wall of this yoke. The upper wall and lateral walls of this yoke thus delimit, between one another, a volume for receiving the adapter according to the invention.

The particular yoke to which the invention applies more specifically also has two apertures that are each arranged longitudinally on one of the lateral walls of the yoke starting from a free front end edge of this lateral wall, this free front end forming the end by which the adapter of the invention is introduced into this yoke. These apertures may advantageously be involved in the connection between the adapter and the drive arm. However, the mechanical constraints for manufacturing the drive arm and, in particular, its yoke mean that the dimensional tolerances of these apertures are not very precise and that the adapters generally available on the aftersales market for spare parts and accessories for wiper systems cannot always reliably ensure such a connection. In some cases, the adapter cannot be mounted on the yoke because of these tolerance deviations.

An aim of the invention is to provide an adapter that allows effective use of these apertures for the mounting of the adapter on the yoke and also for centering and wedging the adapter with the drive arm, in particular regardless of the dimensional tolerance of the apertures, such centering and wedging taking place in a vertical direction.

The invention relates to an adapter intended to connect a windshield wiper to a drive arm of a wiper system for a vehicle, the adapter having a head and a body which extend in the continuation of one another in a longitudinal direction of the adapter, the adapter being formed at least by an upper wall and at least by two lateral flanks extending from the upper wall, the adapter having at least one centering means configured to center it with respect to the drive arm in a vertical direction perpendicular to the upper wall, characterized in that the centering means is continued longitudinally along the body by a guide member configured to be engaged with the drive arm, the adapter comprising a tongue configured to wedge the adapter in the vertical direction. The guide member makes it easier to install the adapter in a wiper system. The position of the adapter with respect to the drive arm is ensured by virtue of the centering means and the cooperation between the adapter and the drive arm is made more reliable by the tongue.

By convention, throughout the present document, the term "longitudinal" applies to the direction in which the head and the body of the adapter according to the invention extend in the continuation of one another, the term "transverse" applies to a direction substantially perpendicular to the longitudinal direction and joining together the lateral flanks of the adapter according to the invention, and the term "vertical" denotes the direction perpendicular both to the longitudinal direction and to the transverse direction, that is to say perpendicular to the upper wall of the adapter.

According to one feature, the adapter comprises a means for rotational connection to a connector secured to the windshield wiper, the upper wall and the lateral flanks delimiting an internal volume of the adapter in which the connector is able to extend.

With reference to the different directions mentioned above, the head and body of the adapter according to the invention thus each have, in a vertical transverse plane, a section of which the shape is substantially that of an inverted U. This inverted U is formed by the upper wall and the two lateral flanks extending perpendicularly or substantially perpendicularly to the upper wall, the two, vertical or substantially vertical, lateral flanks of this head and/or of this body. The upper wall and lateral flanks of the adapter according to the invention jointly delimit the internal volume of the adapter. The internal volume of the adapter is configured to accommodate the connector secured to the windshield wiper. Thus, the internal volume accommodates the means for rotational connection which is formed integrally with the upper wall and/or with one and/or the other lateral flank.

The adapter according to the invention has the centering means intended to cooperate with the drive arm. This cooperation is effected in particular with at least one of the apertures arranged in at least one of the lateral walls of a yoke of the above-defined type. This centering is realized in a direction perpendicular to a plane through which an upper wall of the adapter passes, that is to say the above-defined vertical direction.

Advantageously, the centering means is arranged on one of the lateral flanks of the adapter. In particular, the centering means is arranged on one of the lateral flanks of the adapter, continuing the head onto the lateral flank of the body.

The adapter according to the invention has the guide member intended to control the path of insertion of the adapter into the yoke, specifically from an engagement position to an implementation position of the adapter. When the adapter is in the implementation position, the guide member is engaged in a thickness of one of the lateral walls of the yoke.

The adapter according to the invention has the tongue. The tongue is configured to wedge the adapter in the vertical direction when it is engaged with the drive arm. The tongue, in the implementation position, bears against one of the lateral walls of the yoke. In order to wedge the adapter in the vertical direction, the tongue is situated on one of the lateral flanks of the adapter.

In one exemplary embodiment, the adapter is a one-piece structure obtained by molding. Thus, the various parts of the adapter cannot be taken apart without damaging the adapter.

According to one aspect of the invention, the tongue is formed integrally with the body and/or with the guide member. More preferably, the tongue is only formed integrally with the guide member and is located at a distance from the lateral flank next to which it extends, this having the effect of increasing its plastic deformability, and therefore the mountability of the adapter in a yoke. The tongue may be attached to the body of the adapter and/or the head of the adapter, via the guide member. The expression "formed integrally with" means that the tongue is, with the body and/or the guide member, a continuation of the body and/or of the guide member. In other words, the tongue comes from the body and/or the guide member. The tongue therefore cannot be separated from the body and/or from the guide member without harming the integrity of the tongue and the body and/or the guide member.

According to one aspect of the invention, the guide member is carried by a lateral flank of the body of the adapter. In other words, the guide member is formed integrally with the lateral flank of this body. The guide member and the body cannot be separated without damaging one or the other.

According to one aspect of the invention, the centering means and the guide member are disposed beyond a shoulder formed at a boundary between the head and the body of the adapter. At the interface between the head and the body, the shoulder is a boundary between the body and the head of the adapter. It forms a region in which the head and the body of the adapter meet. The centering means protrudes from the shoulder. Advantageously, the interface between the body and the head of the adapter according to the invention forms a shoulder, the dimensions of which are defined to be substantially equal to the thickness of the lateral walls of the yoke of the drive arm, into which the adapter is inserted. According to one embodiment of the invention, this shoulder extends between the upper walls of the head and of the body of the adapter, respectively, and between the lateral walls of the head and of the body, thereby forming a peripheral rim at the interface between this head and this body.

According to one advantageous feature of the invention, the centering means is arranged starting from the shoulder and is continued by the guide member. The centering means and the guide member extend longitudinally beyond this shoulder, in the direction of the body of the adapter according to the invention.

Advantageously, the transverse dimension of this centering means, that is to say its thickness that extends transversely beyond the body of the adapter according to the invention, is identical or substantially identical to the transverse dimension of the shoulder forming the interface between a lateral flank of the head and a lateral flank of the body. Thus, this centering means does not constitute a part protruding from the lateral flank of the head, from which it extends.

Advantageously, the transverse dimension of the guide member, that is to say its thickness that extends transversely beyond the body of the adapter according to the invention, is less than the transverse dimension of the centering means.

According to one aspect of the invention, the tongue is carried by a lateral flank of the body of the adapter. The tongue is formed integrally with the lateral flank at the body of the adapter.

According to one aspect of the invention, the guide member comprises an upper edge face and a lower edge face on the opposite side from the upper edge face, the upper edge face being disposed between the upper wall of the adapter and the lower edge face, the tongue extending between the upper wall of the adapter and the upper edge face. The tongue therefore extends in a space delimited by the upper wall of the body and by the lower edge face of the guide member.

According to one aspect of the invention, the guide member comprises a first longitudinal end joined to the centering means and a free second longitudinal end at the opposite end from the first longitudinal end, the tongue converging toward the second longitudinal end. The tongue takes the form of a slope oriented so as to make it easier to insert the adapter into the yoke.

According to one aspect of the invention, the tongue is able to deform plastically. The plastic deformation of the tongue helps to wedge the adapter with the drive arm. Before the adapter is inserted into the yoke, the tongue is intact. When the guide member is engaged in the aperture in the yoke, during the insertion of the adapter into the yoke, the cooperation between the aperture and the tongue deforms the tongue. In the implementation position, the tongue remains deformed, resting in the aperture.

According to one aspect of the invention, the lower edge face of the guide member is continued by an insertion chamfer that forms an angle of between 200 and 60° with the lower edge face. The chamfer makes it easier to engage the guide member in the aperture in the yoke and allows the adapter to rotate while it is being inserted into the yoke of the drive arm. The angle between the insertion chamfer and the lower edge face is measured between a straight line extending mainly along the insertion chamfer and a line extending mainly along the lower edge face. The angle is measured at the second terminal end of the guide member. The angle, when it is between 20° and 60°, makes it easier to engage the guide member in the aperture in the yoke.

According to one aspect of the invention, the centering means is a half-disk, the center of which passes through a plane containing the shoulder. The centering means has, in its longitudinal direction of extension, a curved shape, the top of the curvature of which is oriented toward the guide member.

According to one embodiment of the invention, this centering means is thus in the form of a disk portion, for example centered on the lateral flank of the head of the adapter that carries it. Such a disk portion is thus delimited by a face aligned with an outer face delimiting the lateral flank of the adapter at the head.

According to one aspect of the invention, each lateral flank of the body carries a guide member. There is one guide member per lateral flank. Thus, the adapter is provided with two guide members.

According to one aspect of the invention, each lateral flank of the body carries a tongue. There is one tongue per lateral flank. Thus, the adapter is provided with two tongues, this helping to balance the position of the adapter in the yoke.

The invention also relates to a connection device comprising an adapter as described above and a connector that is able to be secured to a windshield wiper, wherein the adapter and the connector are connected by a means for rotational connection. The connector of the wiper system cooperates with the adapter in the connection device. The connector of the wiper system is intended to be secured to the windshield wiper.

The adapter according to the invention has, in the region of its body, a means for rotationally connecting it to the connector of a wiper system. According to one exemplary embodiment, this means for rotational connection is made up of at least one cylindrical trunnion centered on a substantially transverse axis of rotation parallel to the upper wall of the adapter and substantially perpendicular to the lateral flanks thereof. This means for rotational connection may comprise two coaxial cylindrical trunnions.

Advantageously, this substantially cylindrical trunnion extends from at least one lateral flank of the body of the adapter according to the invention, within the part of the internal volume of said adapter that is delimited by the upper wall and by the lateral flanks of the adapter, close to the interface between the head and body of this adapter. This trunnion is advantageously intended to cooperate with the connector associated with a windshield wiper during the connection of such a windshield wiper to the adapter according to the invention. More specifically, this trunnion is intended to be engaged in a receiving orifice provided in such a connector.

According to one embodiment variant, the means for rotational connection is made up of at least two openings, which are cylindrical with a circular or square section, arranged in each lateral flank of the body of the adapter. These openings cooperate with the connector associated with a windshield wiper during the connection of such a windshield wiper to the adapter according to the invention. More specifically, these openings are intended to each be engaged with a trunnion formed integrally with the connector, or with a shaft attached to the connector.

According to yet another embodiment, the means for rotational connection comprises a single trunnion provided on one of the lateral flanks of the adapter and a single opening provided in the other lateral flank of the adapter.

The invention also relates to a windshield wiper comprising a connection device as described above. The windshield wiper cooperates with the connector of the connection device. The assembly is intended to be connected to the drive arm via the cooperation between the adapter of the connection device and the yoke of the drive arm. It will be understood that this windshield wiper comprises this connection device when the adapter that is the subject of the first aspect of the invention is mounted on the connector, or disposed inside packaging that includes the windshield wiper.

Finally, the invention covers a wiper system comprising a windshield wiper, a drive arm and an adapter as described above or a connection device as described above, wherein the adapter cooperates with a yoke of the drive arm, characterized in that the centering means is disposed in an aperture arranged in a lateral wall of the yoke, the tongue extending into the aperture to wedge the adapter in the vertical direction with respect to the yoke.

When the adapter according to the invention has been assembled with a drive arm of which the yoke is of the type described above, the body of this adapter is engaged in the receiving volume of this yoke. The receiving volume of the yoke is delimited by an upper wall of the yoke and by two lateral walls that extend from the upper wall of the yoke. When the body of the adapter is engaged in the receiving volume, the upper wall of the adapter, at the level of the body, comes to bear, within this receiving volume, against the upper wall of the yoke, and the lateral walls of the latter advantageously act both as a longitudinal and transverse guide means and as a means for transversely immobilizing the adapter within this receiving volume. To this end, the outside dimensions, in particular, of the body of the adapter according to the invention are advantageously defined to allow this guiding and this immobilization: in other words, the outside dimensions of the body of the adapter according to the invention are advantageously defined to allow easy but tight insertion, i.e. without excessive play, thereof within the receiving volume delimited by the upper wall and by the lateral walls of the yoke of the drive element with which this adapter is intended to cooperate.

Advantageously, the dimensions of the centering means and its configuration on the lateral flank that carries it are defined such that, when the body of the adapter according to the invention is received in the receiving volume of the yoke, this centering means at least partially closes an open-ended opening of the aperture arranged in the corresponding lateral wall of this yoke, at a free edge of this yoke.

Advantageously, the dimensions of the tongue and its configuration on the lateral flank that carries it are defined such that, when the body of the adapter according to the invention is received in the receiving volume of the yoke, the tongue bears against an edge face of the aperture in question. Very advantageously, the tongue is deformed when the body of the adapter according to the invention is received in the receiving volume of the yoke in order to enhance this bearing effect.

Other features and advantages of the present invention will become more clearly apparent from the following description and the drawings, in which.

It should first of all be noted that although the figures set out the invention in detail for its implementation, they may, of course, be used to better define the invention if necessary. It should also be noted that, in all of the figures, elements which are similar and/or perform the same function are indicated by the same reference.

Furthermore, with reference to the orientations and directions defined above, the longitudinal direction will be indicated, throughout the figures, by the axis Ox, the transverse direction will be indicated by the axis Oy, and the vertical direction will be indicated by the axis Oz. These various axes together define an orthonormal frame of reference Oxyz indicated in the various figures. In this frame of reference, the "front" orientation will be defined by the positive sense of the axis Ox, the "rear" orientation being defined by the negative sense of this same axis, and the terms "top" or "upper" will be represented by the positive sense of the axis Oz, the terms "bottom" or "lower" being represented by the negative sense of this same axis Oz.

Figure 1:
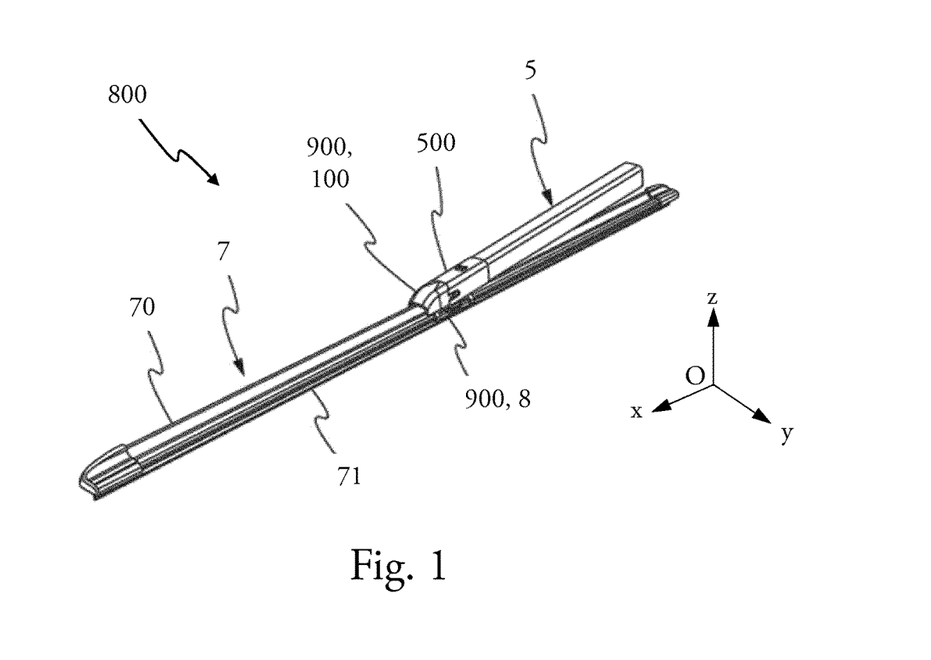
FIG. 1 is a perspective view of a drive arm assembled with a windshield wiper forming a wiper system for a motor vehicle.

FIG. 1 illustrates a wiper system 800 for a motor vehicle incorporating an adapter 100 according to the invention. This wiper system 800 comprises a drive arm 5 which effects an angular back-and-forth movement over a surface to be wiped, and a windshield wiper 7, itself made up in this case of a vertebra 70 carrying a blade rubber 71 made from an elastic material. During the angular back-and-forth movement of the drive arm 5, the windshield wiper 7 and its blade rubber 71 are driven in an angular movement over the glazed surface to carry out the desired wiping/cleaning operation. The windshield wiper 7 is attached to the drive arm 5 by a connection device 900 which comprises a connector 8 and the adapter 100, which are connected together by a means for rotational connection that is not visible once the wiper system 800 has been assembled. The connector 8 is secured to the windshield wiper 7 and the adapter 100 realizes an interface between this connector 8 and a terminal part of the drive arm 5, also known as yoke 500. The connector 8 and the adapter 100 cooperate in order to fasten the windshield wiper 7 to the drive arm 5, and there is an articulated connection between these two elements.

A subject of the invention is a particular type of adapter 100 that is able to cooperate with a particular type of drive arm 5 yoke 500, in particular in order to provide replacement, i.e. retrofit, windshield wipers for "wiper" assemblies in which the drive arm 5 has this particular type of yoke 500.

Figure 2:
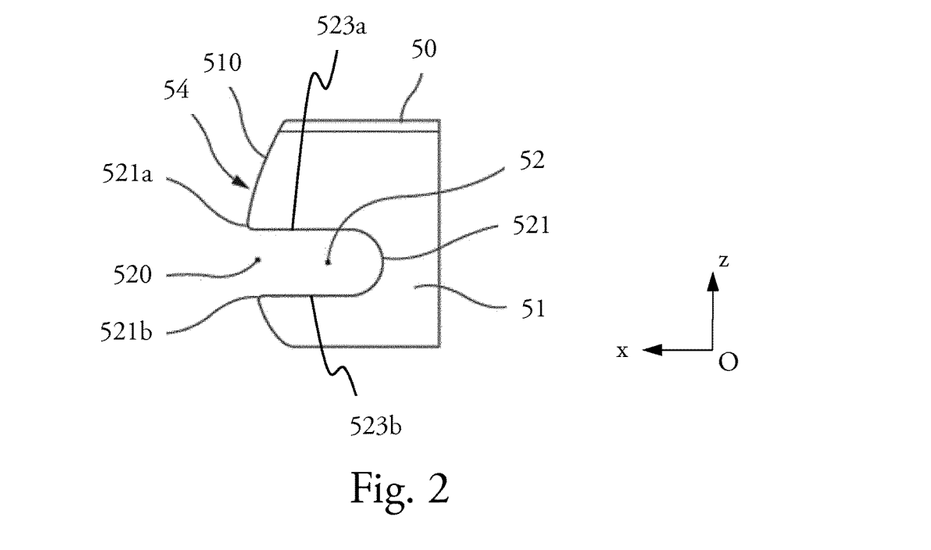
FIG. 2 is a side view of the end of a drive arm yoke of the windshield wiper, the adapter according to the invention being able to cooperate with said yoke.

The yoke 500, depicted schematically and partially in side view in FIG. 2, has an upper wall 50 from which two lateral walls 51 extend substantially perpendicularly to this upper wall 50. The yoke 500 thus has at least one cross section, the shape of which is substantially that of an inverted U, the base of which is formed by the upper wall 50 and the legs of which are formed by the lateral walls 51. The upper wall 50 and lateral walls 51 of this yoke 500 jointly delimit a receiving volume 54, likewise illustrated in FIGS. 4 to 7.

As illustrated in FIG. 2 and in FIGS. 4 to 7, the yoke 500 has, arranged in at least one of its lateral walls 51, an aperture 52. Advantageously, an aperture 52 is arranged in each of the lateral walls 51 of the yoke 500. The yoke 500 thus comprises two apertures 52.

Each of the apertures 52 extends substantially in a direction parallel to the upper wall 50 of the yoke 500, in the direction of the drive arm 5, the yoke 500 of which constitutes the terminal part. The aperture 52 extends from a free edge 510 of the corresponding lateral wall 51, said free edge 510 constituting the end of the yoke against which the adapter 100 in the wiper system 800 bears once accommodated in the yoke.

Each aperture 52 thus opens out at the free edge 510 of the lateral wall 51 through an open-ended opening 520. The open-ended opening 520 is delimited by edges 521a, 521b of the aperture 52. For reasons of ease of manufacture, an end wall 521 of each aperture 52, within the lateral wall 51 in which this aperture 52 is arranged, is advantageously curved. It has substantially a semicircular shape centered within the corresponding aperture 52. The end wall 521 is connected to each edge 521a, 521b by an upper border 523a and a lower border 523b, the upper border 523a being situated between the upper wall 50 of the yoke 500 and the lower border 523b.

Figure 3:
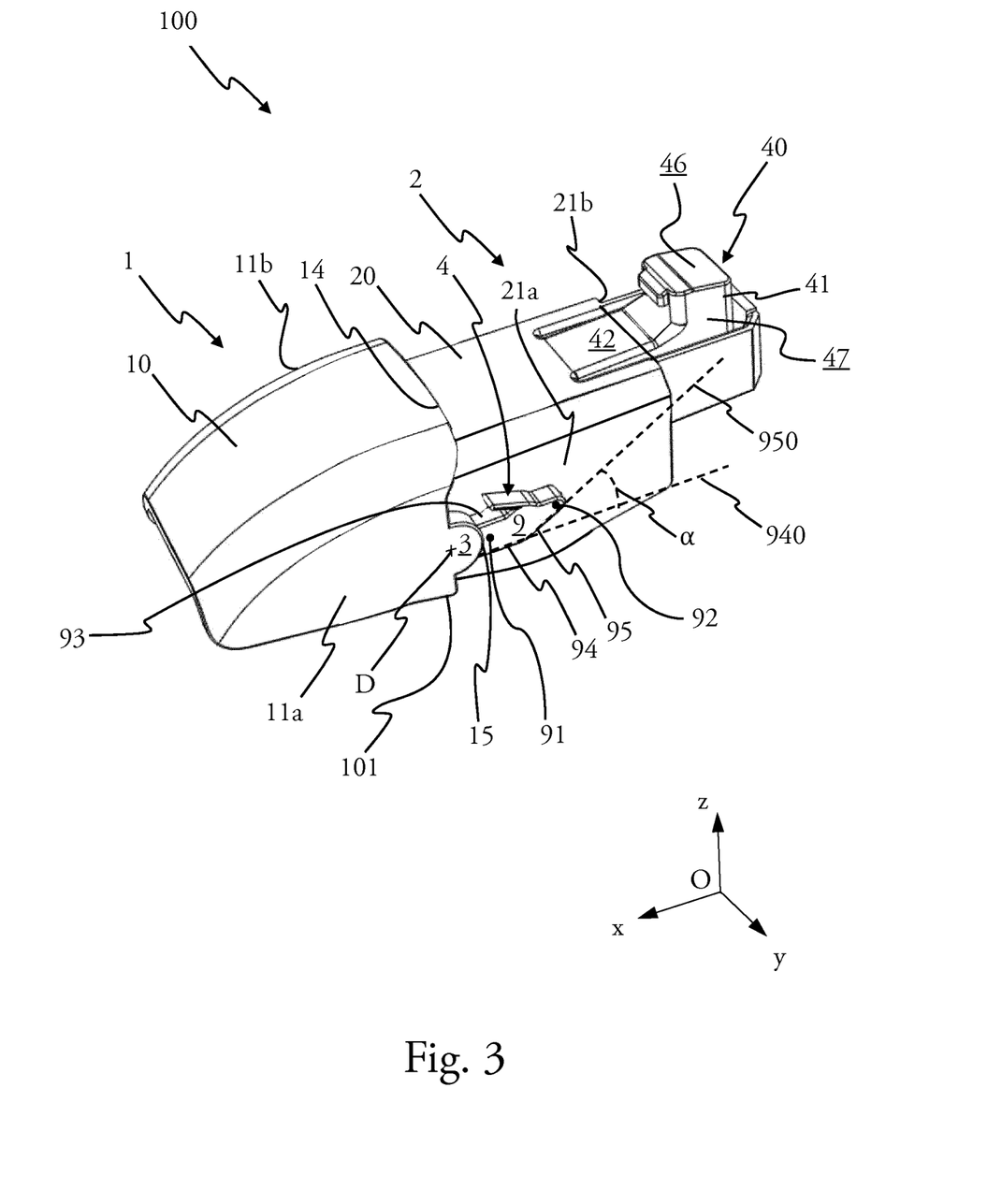
FIG. 3 is a perspective view of the adapter according to the invention, FIGS. 4 to 7 correspond to a set of successive views illustrating a sequence of assembling the adapter according to the invention in the yoke of the drive arm of the windshield wiper.

FIG. 3 illustrates the adapter 100 according to the invention intended to connect the windshield wiper 7 to the drive arm 5 of the wiper system 800 for a vehicle.

The adapter 100 has a head 1 and a body 2 which extend in the continuation of one another in a longitudinal direction Ox of the adapter 100. With reference to the above-defined directions and orientations, the head 1 extends toward the front of the adapter 100 according to the invention and the body 2 extends toward the rear of this same adapter 100.

According to one embodiment of the invention, the adapter 100 is produced by injection-molding a polymer material in a mold, and is formed integrally in one piece. The adapter is in one piece in that the parts of which it is made cannot be separated without harming the integrity of the adapter 100.

The adapter 100 is formed at least by an upper wall 10, 20 and at least by two lateral flanks 11a, 11b, 21a, 21b extending from the upper wall 10, 20. In the example presented in FIG. 3, the adapter 100 is formed by an upper wall 10, 20, a first lateral flank 11a, 21a and a second lateral flank 11b, 21b. The upper wall 10, 20 of the adapter 100 comprises, at the head 1, a first part, called the upper wall 10 of the head 1, and a second part, called the upper wall 20 of the body 2. The first lateral flank 11a, 21a of the adapter 100 comprises, at the head 1, a first part, called the first lateral flank 11a of the head 1, and a second part, called the first lateral flank 21b of the body 2. The second lateral flank 11b, 21b of the adapter 100 comprises, at the head 1, a first part, called the second lateral flank 11b of the head 1, and a second part, called the second lateral flank 21b of the body 2.

The longitudinal dimension of the adapter 100, measured in the longitudinal direction Ox, is greater than the transverse direction thereof, measured in a direction Oy. The adapter 100 has its greatest dimension in the dimension in the longitudinal direction Ox.

The head 1 is formed by the upper wall 10, the first lateral flank 11a and the second lateral flank 11b, which are substantially vertical and each extend from a longitudinal side of the upper wall 10, substantially perpendicularly to the latter.

The body 2 is formed by the upper wall 20, the first lateral flank 21a and the second lateral flank 21b, which are substantially vertical and each extend from a longitudinal side of the upper wall 20, substantially perpendicularly to the latter.

The first lateral flank 11a of the head 1 and the first lateral flank 21a of the body 2 are exposed in FIG. 3, while the second lateral flanks 11b and 21b, respectively, of the head 1 and of the body 2 are largely concealed on account of the viewing angle of FIG. 3. The head 1 and the body 2 each have, in a vertical transverse plane parallel to the plane Oyz of the above-defined frame of reference, a cross section in the shape of an inverted U, the transverse leg of which is formed by the upper walls 10 and 20, respectively, and the vertical legs of which are formed by the lateral flanks 11a, 11b and 21a, 21b, respectively, of these two parts of the adapter 100 according to the invention.

The upper walls 10 and 20, respectively, of the head 1 and of the body 2 of the adapter 100 according to the invention thus delimit, with the lateral flanks 11a, 11b and 21a, 21b, respectively, of this head 1 and of this body 2, an internal volume 101 of this adapter 100, suggested in FIG. 3. The connector 8 is able to extend in this internal volume 101. The adapter 100 comprises a means for rotational connection to the connector 8 secured to the windshield wiper 7. This means for rotational connection is at least partially accommodated in the internal volume 101.

The adapter 100 has at least one centering means 3 configured to center the adapter 100 with respect to the drive arm 5 in the vertical direction Oz. The centering means 3 is continued longitudinally along the body 2 by a guide member 9 configured to be engaged with the drive arm 5. The guide member 9 is carried by the lateral flank 11a of the adapter 100 at the head 1 of the adapter 100. In this exemplary embodiment, the centering means 3 takes the form of a half-disk having a center D. The centering means 3 and the guide member 9 continue the head 1 of the adapter 100. They are both formed integrally with the first lateral flank 21a of the body 2.

Each lateral flank 11a, 11b of the head 1 carries a single guide member 9 and a single centering means 3. Only one of these is visible in FIG. 3 on account of the viewing angle.

The guide member 9 comprises a first longitudinal end 91 and a second longitudinal end 92 at the opposite end from the first longitudinal end 91. The guide member 9 thus has an elongate overall shape in the longitudinal direction Ox. The first longitudinal end 91 is joined to the centering means 3. The second longitudinal end 92 is free.

The guide member 9 comprises an upper edge face 93 and a lower edge face 94 on the opposite side from the upper edge face 93. The upper edge face 93 is disposed between the upper wall 10, 20 of the adapter 100 and the lower edge face 94.

The adapter 100 comprises a tongue 4 configured to wedge the adapter 100 in the vertical direction Oz. Each lateral flank 11a, 11b of the head 1 carries a single tongue 4. Only one of these is visible in FIG. 3 on account of the viewing angle.

The tongue 4 extends between the upper wall 10, 20 of the adapter 100 and the lower edge face 93. The tongue 4 converges toward the second longitudinal end 92 so as to make it easier to insert the guide member 9.

In this exemplary embodiment, the tongue 4 is formed integrally with the body 2 and the guide member 9. The tongue 4 is carried by the lateral flank 11a of the adapter 100 at the head 1.

The centering means 3 and the guide member 9 are disposed beyond a shoulder 14 formed at the interface of the head 1 and the body 2. The shoulder 14 is substantially parallel to the vertical transverse plane Oyz of the above-defined orthonormal frame of reference, extending from the head 1 and returning toward the body 2. The shoulder 14 thus extends, according to this embodiment of the invention, around the entire periphery of the interface between the head 1 and body 2 of the adapter 100 according to the invention. In a particular manner, the center D of the centering means 3 passes through a plane containing the shoulder 14.

A transverse dimension measured at the centering means 3 is slightly greater than a transverse dimension measured at the guide member 9. The transverse dimension Oy of the head 1 is slightly greater at the centering means 3 than at the tongue 4, these being measured in the same direction. The transverse dimension Oy of the guide member 9 and that of the tongue 4 are identical. In other words, there is a lateral discontinuity 15 between the centering means 3 and the guide member 9, substantially parallel to the vertical transverse plane Oyz of the above-defined orthonormal frame of reference, extending from the head 1 and returning toward the body 2.

The lower edge face 94 of the guide member 9 is continued by an insertion chamfer 95. The insertion chamfer 95 forms an angle α of between 20° and 60° with the lower edge face 94. A straight line 950 extending along the insertion chamfer 95 and a line 940 extending along the lower edge face 94 make it possible to measure the angle α formed by the insertion chamfer 95.

FIG. 3 also illustrates the existence of a locking device 40 intended to immobilize the adapter 100 longitudinally, that is to say in the direction Ox, in the yoke of the drive arm. The locking device 40 is in the general form of a protrusion 41 arranged in the vicinity of a rear longitudinal end of the adapter 100 according to the invention, at the opposite end from the head 1 of this adapter 100. This protrusion 41 is provided at the end of a flexible tab 42 and is formed by a distal wall 46 advantageously substantially parallel to the upper wall 20 of the body 2 of the adapter 100 according to the invention, a set of lateral walls 47 extending from said distal wall 46 in the direction of said upper wall 20 of the body 2 of the adapter 100 according to the invention. The locking means 40 is therefore retractable by bending of the flexible tab 42.

According to one embodiment of the invention, this protrusion 41 has a substantially parallelepipedal shape and therefore has four lateral walls 47 that extend from its distal wall 46 in the direction of the body 2 of the adapter 100. Advantageously, the distal wall 46 of the protrusion forming the first means for immobilizing the adapter 100 according to the invention extends on the outside of the internal volume 101 delimited by the upper wall 10 and the lateral flanks 11a, 11b of the head 1 and the upper wall 20 and the lateral flanks 21a, 21b of the body 2 of said adapter 100.

Figure 5:
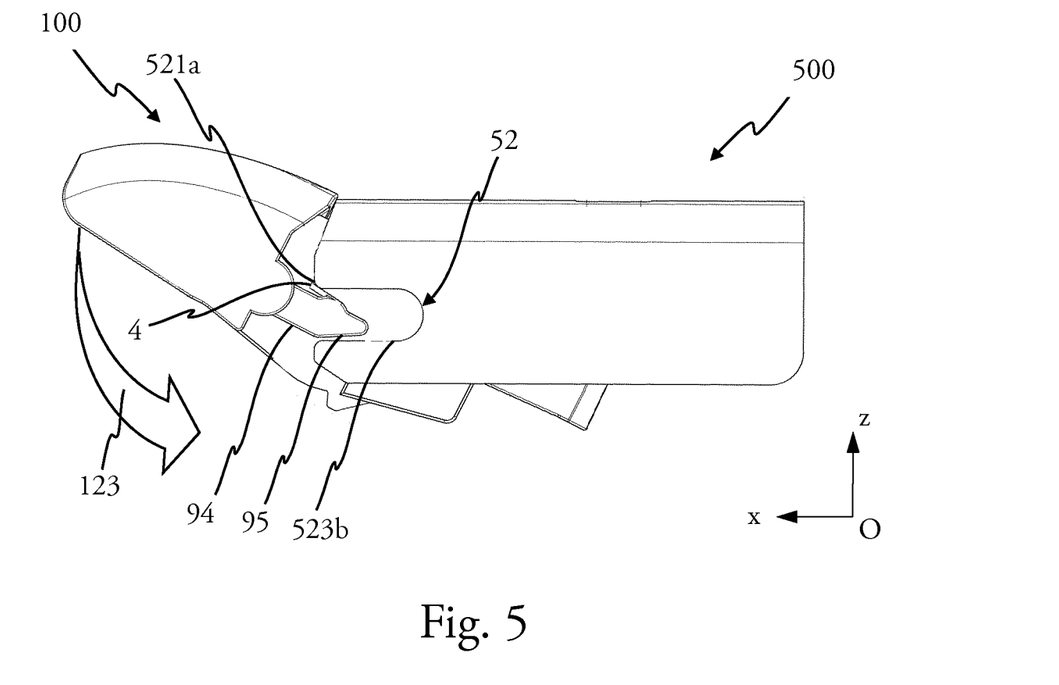
Figure 6:
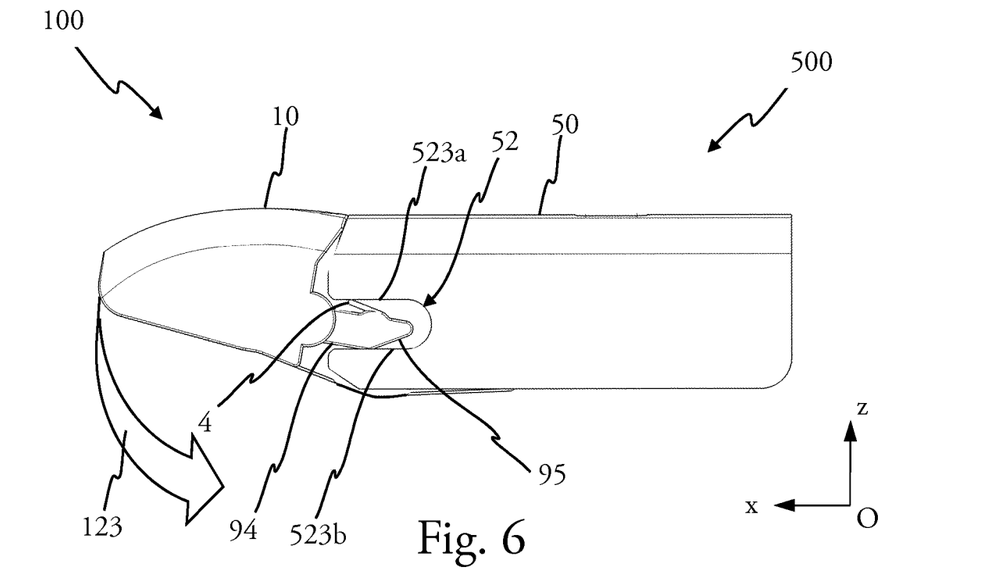
Figure 7:
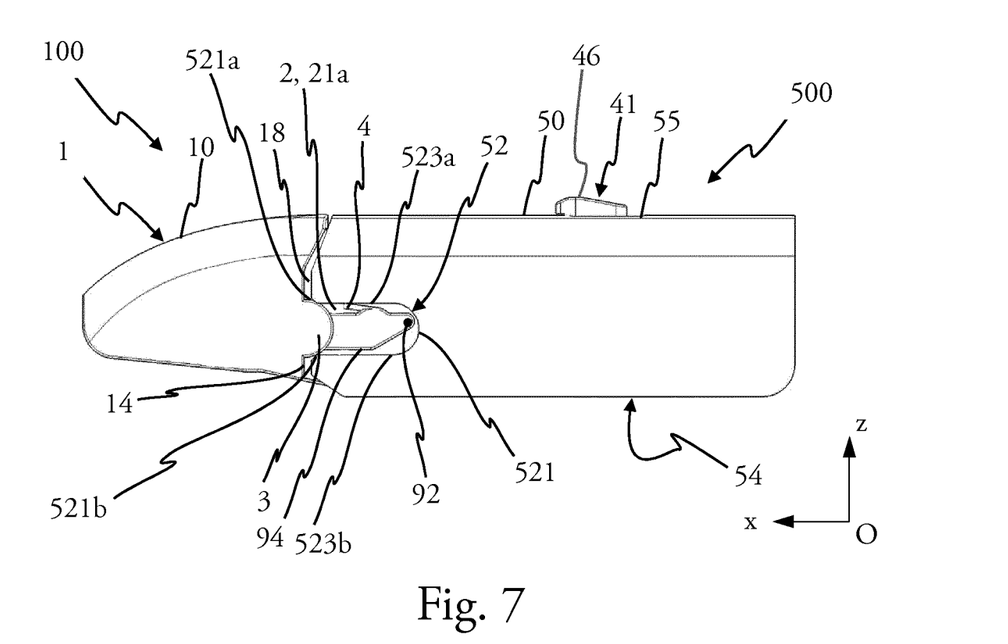

FIGS. 4 to 7 illustrate how the adapter 100 according to the invention is brought into cooperation with a yoke 500 of the type described above and illustrated in FIG. 2. The assembly process is described in FIGS. 4 to 6. In FIG. 7, the adapter 100 according to the invention is shown assembled with the yoke 500, in other words in the implementation position of the windshield wiper.

During the assembly of the adapter 100 according to the invention with a yoke 500 of the above-described type, the body 2 of the adapter 100 is inserted into the receiving volume 54 of the yoke 500. During the assembly process, the protrusion 41 is in the receiving volume 54 and can be brought to bear against the upper wall 50 of the yoke 500. The protrusion 41 is visible only when it coincides with a mouth 55 provided in the upper wall 50 of the yoke 500 so as to immobilize the adapter 100 in the direction Ox.

Figure 4:
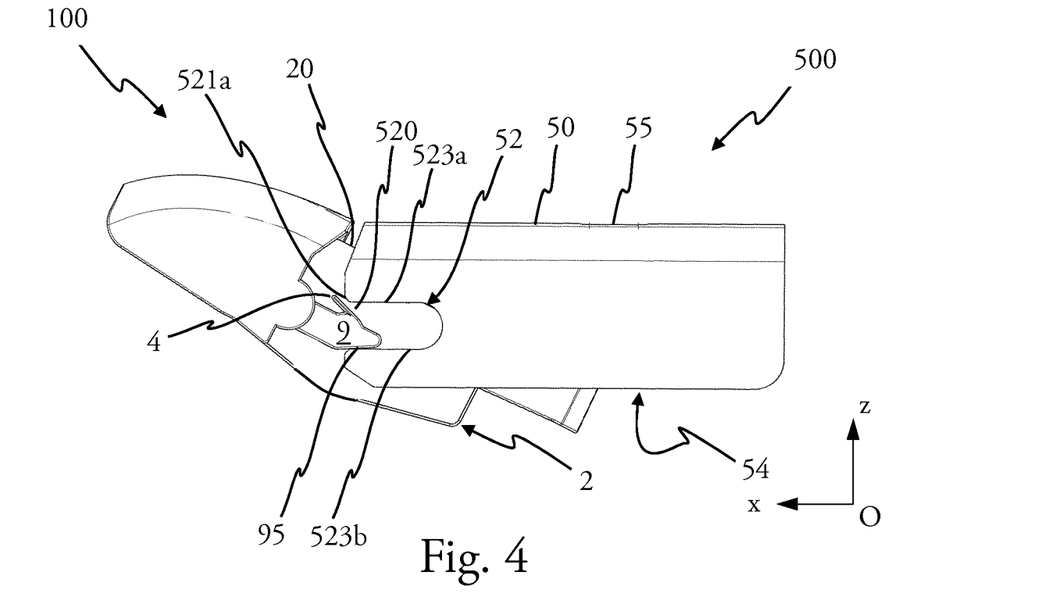

FIG. 4 illustrates a step of engaging the guide member 9 in the aperture 52.

The engagement of the adapter 100 in the yoke 500 is guided by virtue of the guide member 9. The guide member 9 is inserted into the open-ended opening 520 of the aperture 52, at an insertion angle allowing the insertion chamfer 95 to be in full contact with the lower border 523b of the aperture 52, in order to slide therein. In parallel with this movement, the upper wall 20 of the body 2 comes to bear, within this receiving volume 54, against the upper wall 50 of the yoke 500, and the tongue 4 deforms by bearing, on the upper border 523a side, against the edge 521a of the open-ended opening 520 of the aperture 52.

FIG. 5 illustrates a step during the assembly process, when the insertion chamfer 95 has been fully inserted into the aperture 52. The insertion chamfer 95 is in full contact with the lower border 523b of the aperture 52. The tongue 4 bears against the edge 521a, causing it to bend. On account of the forces exerted at the tongue 4, in order for the adapter 100 to continue its progression in the yoke 500, the adapter 100 has to effect a rotational movement indicated by an arrow 123 in order for the lower edge face 94 of the guide member 9 to be positioned in full contact with the lower border 523b of the aperture 52.

The rotational movement illustrated by the arrow 123 is at a more advanced stage in FIG. 6. The upper wall 10 of the head 1 of the adapter 100 is in contact with the upper wall 50 of the yoke 500. The plastic deformation of the tongue 4 is increased, the tongue 4 being pressed against the upper border 523a of the aperture 52. The chamfer is no longer in contact with the lower border 523b. It is the lower edge face 94, as a result of the rotational movement indicated by the arrow 123, which is thus transiently in contact with the lower border 523b and which ensures the bearing of the adapter on the side of the lower border 523b that is necessary for the deformation of the tongue 4.

FIG. 7 corresponds to the implementation position of the adapter, that is to say the position in which the windshield wiper is locked with the drive arm for normal use of this windshield wiper. As illustrated in FIG. 7, the progression of the adapter 100 in the yoke 500 is ended when the centering means 3 comes to bear against the edges 521a, 521b that delimit the inlet of the aperture 52. As a result of this interaction, there may be a space 18 between the shoulder 14 and the yoke 500, although this is not absolutely necessary for the invention. The tongue 4, which has undergone plastic deformation, extends in the aperture 52 in a manner bearing against the upper border 523a in order to wedge the adapter 100 with respect to the yoke 500. In spite of this plastic deformation, the tongue 4 remains transversely joined to the lateral flank 21a of the body 2. There may be a space between the upper border 523a and the upper edge face of the guide member and/or there may be a space between the lower border 523b and the lower edge face 94 of the guide member 9.

The protrusion 41 extends out of the receiving volume 54 when it coincides with the mouth 55 provided in the upper wall 50 of the yoke 500.

The adapter 100 is thus wedged by the tongue 4, which pushes the adapter 100 in the direction Oz so as to establish contact between the centering means 3 and the edge 521b of the aperture 52 situated in the continuation of the lower border 523b. It is also wedged by the protrusion 41 in the direction Ox.

FIG. 7 illustrates the fact that the upper wall 10 of the head 1 of the adapter 100 is coplanar, or substantially coplanar, with the upper wall 50 of the yoke 500. The upper wall 20 of the body 2 of the adapter is, by contrast, contained in the receiving volume 54, apart from the protrusion 41, the distal wall 46 of which protrudes above the upper wall 50 of the yoke 500.

It will be understood from reading the above that the present invention provides an adapter intended to connect a windshield wiper to a drive arm of a wiper system for a vehicle, said adapter being configured to ensure the centering and immobilization thereof with respect to a yoke of the drive arm, specifically in a simple and effective manner. This adapter, which is intended to interact with a specific type of yoke, improves the reliability of the connection and the mounting of the adapter in the yoke is made easier, regardless of the manufacturing tolerances of the adapter and/or of the yoke.

The invention is not limited to the means and configurations described and illustrated herein, however, and also extends to all equivalent means or configurations and to any technically functional combination of such means. In particular, the shape of the adapter may be modified without having a negative effect on the invention, provided that the adapter ultimately fulfills the same functionalities as those described in this document.

The invention claimed is:

1. A wiper system comprising:
   an adapter configured to connect a windshield wiper to a drive arm of the wiper system for a vehicle, the adapter comprising:
   a head and a body which extend in a continuation of one another in a longitudinal direction of the adapter,
   a tongue configured to wedge the adapter in a vertical direction (Oz),
   the adapter being formed at least by an upper wall and at least by two lateral flanks extending from the upper wall;
   at least one centering means configured to center it with respect to the drive arm in a vertical direction perpendicular to the upper wall, wherein the centering means is continued longitudinally along the body by a guide member configured to be engaged with the drive arm;
   the windshield wiper; and
   the drive arm;
   wherein the centering means is disposed in an aperture arranged in a lateral wall of a yoke of the drive arm, and the aperture is parallel to an upper wall of the yoke,
   wherein the adapter cooperates with the yoke of the drive arm, wherein the tongue extending into the aperture to wedge the adapter in the vertical direction with respect to the yoke.

2. The wiper system as claimed in claim 1, wherein the tongue is formed integrally with the body and/or with the guide member.

3. The wiper system as claimed in claim 1, wherein the guide member is carried by a lateral flank of the body of the adapter.

4. The wiper system as claimed in claim 1, wherein the centering means and the guide member are disposed beyond a shoulder formed at a boundary between the head and the body.

5. The wiper system as claimed in claim 4, wherein the centering means is a half-disk, the center of which passes through a plane containing the shoulder.

6. The wiper system as claimed in claim 1, wherein the tongue is carried by a lateral flank of the body of the adapter.

7. The wiper system as claimed in claim 1, wherein the guide member comprises an upper edge face and a lower edge face on an opposite side from the upper edge face, the upper edge face being disposed between the upper wall of the adapter and the lower edge face, the tongue extending between the upper wall of the adapter and the upper edge face.

8. The wiper system as claimed in claim 7, wherein the lower edge face of the guide member is continued by an insertion chamfer that forms an angle (a) of between 20° and 60° with the lower edge face.

9. The wiper system as claimed in claim 1, wherein the guide member comprises a first longitudinal end joined to the centering means and a free second longitudinal end at an opposite end from the first longitudinal end, the tongue converging toward the second longitudinal end.

10. The wiper system as claimed in claim 1, wherein the tongue is able to deform plastically.

11. The wiper system of claim 1, further comprising:
    a connector that is able to be secured to the windshield wiper, wherein the adapter and the connector are connected by a means for rotational connection.

12. An adapter configured to connect a windshield wiper to a drive arm of a wiper system for a vehicle, the adapter comprising:

a head and a body which extend in the continuation of one another in a longitudinal direction of the adapter, the adapter being formed at least by an upper wall and at least by two lateral flanks extending from the upper wall;

at least one centering means configured to center it with respect to the drive arm in a vertical direction perpendicular to the upper wall, wherein the centering means is continued longitudinally along the body by a guide member configured to be engaged with the drive arm; and a tongue configured to wedge the adapter in the vertical direction (Oz), wherein the guide member comprises an upper edge face and a lower edge face on an opposite side from the upper edge face, the upper edge face being disposed between the upper wall of the adapter and the lower edge face, the tongue extending between the upper wall of the adapter and the upper edge face.

13. An adapter configured to connect a windshield wiper to a drive arm of a wiper system for a vehicle, the adapter comprising:

a head and a body which extend in the continuation of one another in a longitudinal direction of the adapter, the adapter being formed at least by an upper wall and at least by two lateral flanks extending from the upper wall;

at least one centering means configured to center it with respect to the drive arm in a vertical direction perpendicular to the upper wall, wherein the centering means is continued longitudinally along the body by a guide member configured to be engaged with the drive arm; and a tongue configured to wedge the adapter in the vertical direction (Oz), wherein the guide member comprises a first longitudinal end joined to the centering means and a free second longitudinal end at an opposite end from the first longitudinal end, the tongue converging toward the second longitudinal end.

14. A wiper system comprising:

an adapter configured to connect a windshield wiper to a drive arm of the wiper system for a vehicle, the adapter comprising:

a head and a body which extend in a continuation of one another in a longitudinal direction of the adapter, a tongue configured to wedge the adapter in the vertical direction (Oz), the adapter being formed at least by an upper wall and at least by two lateral flanks extending from the upper wall;

at least one centering means configured to center it with respect to the drive arm in a vertical direction perpendicular to the upper wall, wherein the centering means is continued longitudinally along the body by a guide member configured to be engaged with the drive arm; and wherein the centering means is disposed in an aperture arranged in a lateral wall of a yoke, and the aperture is parallel to an upper wall of the yoke, and wherein the guide member comprises an upper edge face and a lower edge face on an opposite side from the upper edge face, the upper edge face being disposed between the upper wall of the adapter and the lower edge face, the tongue extending between the upper wall of the adapter and the upper edge face.

* * * * *